US012178355B2

(12) United States Patent
Abeygunawardana et al.

(10) Patent No.: US 12,178,355 B2
(45) Date of Patent: Dec. 31, 2024

(54) BEVERAGE DISPENSING ASSEMBLY FOR AN APPLIANCE

(71) Applicant: Haier US Appliance Solutions, Inc., Wilmington, DE (US)

(72) Inventors: Danister Abeygunawardana, Jeffersonville, IN (US); Jianwu Li, Louisville, KY (US); Gregory Scott Carr, Louisville, KY (US); Brent Alden Junge, Evansville, IN (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 778 days.

(21) Appl. No.: 17/323,107

(22) Filed: May 18, 2021

(65) Prior Publication Data
US 2022/0369852 A1    Nov. 24, 2022

(51) Int. Cl.
*A47J 31/46* (2006.01)
*A47J 31/40* (2006.01)
*A47J 31/44* (2006.01)
*F25D 23/12* (2006.01)

(52) U.S. Cl.
CPC ........... *A47J 31/468* (2018.08); *A47J 31/407* (2013.01); *A47J 31/446* (2013.01); *F25D 23/126* (2013.01)

(58) Field of Classification Search
CPC ...... A47J 31/468; A47J 31/407; A47J 31/446; F25D 23/126
USPC .......................................................... 99/300
See application file for complete search history.

(56) References Cited

U.S. PATENT DOCUMENTS

| 5,865,096 | A | * | 2/1999 | Kawabata | A47J 31/36 99/302 R |
| 6,606,938 | B2 | * | 8/2003 | Taylor | A47J 31/32 426/77 |
| 7,997,448 | B1 | * | 8/2011 | Leyva | B67D 1/1247 222/1 |
| 8,215,228 | B2 | * | 7/2012 | Skalski | B65D 85/8049 99/290 |
| 8,227,000 | B2 | * | 7/2012 | Skalski | B65D 85/8049 426/77 |

(Continued)

FOREIGN PATENT DOCUMENTS

| CN | 202960131 U | 6/2013 |
| CN | 108577552 A | 9/2018 |
| CN | 105832161 B | 1/2019 |

*Primary Examiner* — Jimmy Chou
(74) *Attorney, Agent, or Firm* — Dority & Manning, P.A.

(57) ABSTRACT

A beverage dispensing assembly may include a dispenser body, one or more flanges, a brew module, and a water delivery system. The dispenser body may define a dispenser recess. The flanges may extend from and below an upper wall. The brew module may be selectively installed within the dispenser recess and define a brew chamber therein. The brew module may include one or more rails movably received on the one or more flanges to support the brew module within the dispenser recess. The water delivery system may be mounted to the dispenser body in selective engagement with the brew module. The water delivery system may include a delivery nozzle and a biasing spring. The delivery nozzle may be slidably attached to the upper wall and axially slidable between a lowered position and an elevated position. The biasing spring may motivate the delivery nozzle toward the lowered position.

20 Claims, 14 Drawing Sheets

(56) References Cited

U.S. PATENT DOCUMENTS

| | | | | |
|---|---|---|---|---|
| 8,297,180 B2* | 10/2012 | Skalski | ............... | A47J 31/0668 99/279 |
| 9,352,950 B2* | 5/2016 | Berger | ................ | B67D 1/0895 |
| 10,533,790 B2* | 1/2020 | Sakthivel | ............... | F25D 23/126 |
| 10,674,860 B2* | 6/2020 | Miller | ................... | F25D 23/126 |
| 10,786,109 B2* | 9/2020 | Sakthivel | ............... | F25D 23/04 |
| 10,912,409 B2* | 2/2021 | Wantland | ................... | F25C 5/22 |
| 11,825,981 B2* | 11/2023 | Abeygunawardana | ..................... | A47J 31/4407 |
| 2008/0041232 A1* | 2/2008 | Fai | ..................... | A47J 31/4467 99/279 |
| 2009/0241782 A1* | 10/2009 | Van Dillen | ............. | A47J 31/44 137/15.01 |
| 2009/0293530 A1* | 12/2009 | Van Dillen | .......... | B67D 1/0861 222/146.1 |
| 2010/0154649 A1* | 6/2010 | Skalski | ............... | A47J 31/0668 222/173 |
| 2012/0121779 A1* | 5/2012 | Lai | ......................... | A47J 31/42 426/433 |
| 2012/0186293 A1* | 7/2012 | Skalski | ............... | A47J 31/0668 99/300 |
| 2013/0105340 A1* | 5/2013 | Hother | ................. | A47J 31/3676 206/222 |
| 2013/0112576 A1* | 5/2013 | Hother | ....................... | C12P 7/08 206/222 |
| 2014/0013958 A1* | 1/2014 | Krasne | ................... | A47J 31/057 99/284 |
| 2014/0120223 A1* | 5/2014 | Boubeddi | ............. | A47J 31/407 99/295 |
| 2014/0147560 A1* | 5/2014 | Radhakrishnan | ... | A47J 31/3614 99/283 |
| 2014/0299000 A1* | 10/2014 | Hanneson | ........... | A47J 31/3695 99/323 |
| 2014/0360379 A1* | 12/2014 | Radhakrishnan | ... | A47J 31/3633 99/323 |
| 2015/0107460 A1* | 4/2015 | Wilson | ...................... | F25D 3/11 99/295 |
| 2016/0058242 A1* | 3/2016 | Viet-Doan | ............ | A47J 31/005 99/283 |
| 2016/0157665 A1* | 6/2016 | Doglioni Majer | .... | A47J 31/404 426/433 |
| 2016/0157668 A1* | 6/2016 | Bugnano | ............. | A47J 31/4492 426/232 |
| 2017/0245675 A1* | 8/2017 | Junge | ................. | B65D 85/8043 |
| 2018/0008087 A1* | 1/2018 | Miller | ................... | A47J 31/407 |
| 2018/0084938 A1* | 3/2018 | Sakthivel | ............. | F25D 23/126 |
| 2018/0299190 A1* | 10/2018 | Sakthivel | ............. | B67D 1/0888 |
| 2020/0029725 A1* | 1/2020 | Wantland | .............. | A47J 31/407 |
| 2022/0071437 A1* | 3/2022 | Tseng | ................. | A47J 31/4492 |

\* cited by examiner

BEVERAGE DISPENSING ASSEMBLY FOR AN APPLIANCE

FIELD OF THE INVENTION

The present subject matter relates generally to beverage dispensers, such as single serve beverage dispenser for use in domestic appliances.

BACKGROUND OF THE INVENTION

Recently, popularity for appliances capable of generating single serve (e.g., hot) beverages has increased. These beverages (e.g., coffee or tea) may be generated using heated liquid water provided to and through a dispenser of the appliance. Such dispensers generally use brew modules that can receive a single serve brew pod or cup holding a particulate (e.g., coffee grounds, tea leaves, etc.) for a desired beverage. Such brew pods may be prepacked (e.g., by a manufacturer as a disposable unit) or filled by an end user (e.g., as a reusable unit or cup). Conventional brew modules include a brew chamber that holds a brew pod therein. A lower needle may be positioned in the bottom of the brew chamber and a stationary upper needle may extend from a lid which is pivotally attached to the brew module. Each needle defines holes through which liquid may flow. Closing the lid causes the lid to push down the brew pod while upper and lower needles to pierce the top and bottom of the brew pod, respectively, such that water may flow through the brew pod to create the beverage which is dispensed to the user.

In conventional systems, many complex or expensive parts may be required to ensure water is properly and safely delivered. For instance, one or more motors may be required to move a water delivery tube into alignment with the brew pod. Such systems may be unable to ensure proper clearances (e.g., to permit installation/removal of the brew module or pod) or prevent water leaks (e.g., at connection points within the assembly) without the force and control gained by a motorized water delivery tube. Nonetheless, the use of one or more motors may add complexities or expenses in assembly, and can obviously increase the number of parts that may fail and thereby prevent operation of the dispenser.

Additionally or alternatively, difficulties may arise when trying properly place a brew pod within or to remove a brew pod from the brew chamber. For instance, it can be difficult to ensure proper insertion of a brew without relying on complex electronic systems or risking damage to the brew module. Additionally or alternatively, once inserted, it can be difficult for a user to reach or access the brew pod. In some such systems, only a small portion of a lip or rim on the brew pod may be accessible. Moreover, if a needle has pierced the brew pod, a friction or interference fit may be formed between the needle and the brew pod. The interference fit may restrict or hinder movement of the brew pod from the brew chamber, for instance, in a vertical direction.

Further additionally or alternatively, difficulties may arise in conventional system when attempting to clean the brew module. In particular, the brew chamber may become dirty over time as particulate or residue may accumulate within the brew chamber. Nonetheless, many brew modules are permanently affixed to the appliance. Even brew modules that are not fixed to the appliance may be difficult to adequately clean since, for instance, smaller crevices or needles may be hard for a user to access (e.g., for practical reasons, safety concerns, etc.).

Accordingly, a domestic appliance that includes improved features for dispensing single serve beverages would be useful. For instance, single serve beverage dispensing assemblies for appliances that decrease complexity or expense, or otherwise ensure reliable operation (e.g., without the need of a motorized water delivery tube). Additionally or alternatively, single serve beverage dispensing assemblies for appliances that improve access to the brew pod would be useful. Further additionally or alternatively, single server beverage assembles for appliances that may be readily removed, cleaned, or reinstalled would be useful.

BRIEF DESCRIPTION OF THE INVENTION

Aspects and advantages of the invention will be set forth in part in the following description, or may be obvious from the description, or may be learned through practice of the invention.

In one exemplary aspect of the present disclosure, a beverage dispensing assembly is provided. The beverage dispensing assembly may include a dispenser body, one or more flanges, a brew module, and a water delivery system. The dispenser body may define a dispenser recess. The dispenser body may include an upper wall fixed to the appliance above the dispenser recess. The one or more flanges may extend from and below the upper wall. The brew module may be selectively installed within the dispenser recess. The brew module may define a brew chamber therein. The brew module may include one or more rails movably received on the one or more flanges to support the brew module within the dispenser recess. The water delivery system may be mounted to the dispenser body in selective engagement with the brew module to deliver water thereto. The water delivery system may include a delivery nozzle and a biasing spring. The delivery nozzle may be slidably attached to the upper wall. The delivery nozzle may include a nozzle tip defining a water outlet to direct water to the brew module. The delivery nozzle may be axially slidable between a lowered position and an elevated position. The biasing spring may motivate the delivery nozzle toward the lowered position.

In another exemplary aspect of the present disclosure, a beverage dispensing assembly is provided. The beverage dispensing assembly may include a dispenser body, one or more flanges, a brew module, and a water delivery system. The dispenser body may define a dispenser recess. The dispenser body may include an upper wall fixed to the appliance above the dispenser recess. The one or more flanges may extend from and below the upper wall. The brew module may be selectively installed within the dispenser recess and include a brewing body and a lid. The brewing body may define a brew chamber therein. The lid may be selectively attached to the brewing body. The lid may define an inlet upstream from the brew chamber. The lid may include one or more rails movably received on the one or more flanges to support the brew module within the dispenser recess. The water delivery system may be mounted to the dispenser body in selective engagement with the brew module to deliver water thereto. The water delivery system may include a delivery nozzle and a biasing spring. The delivery nozzle may be slidably attached to the upper wall. The delivery nozzle may include a nozzle tip defining a water outlet to direct water to the brew module. The delivery nozzle may be axially slidable between a lowered position and an elevated position. The biasing spring may motivate the delivery nozzle toward the lowered position.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
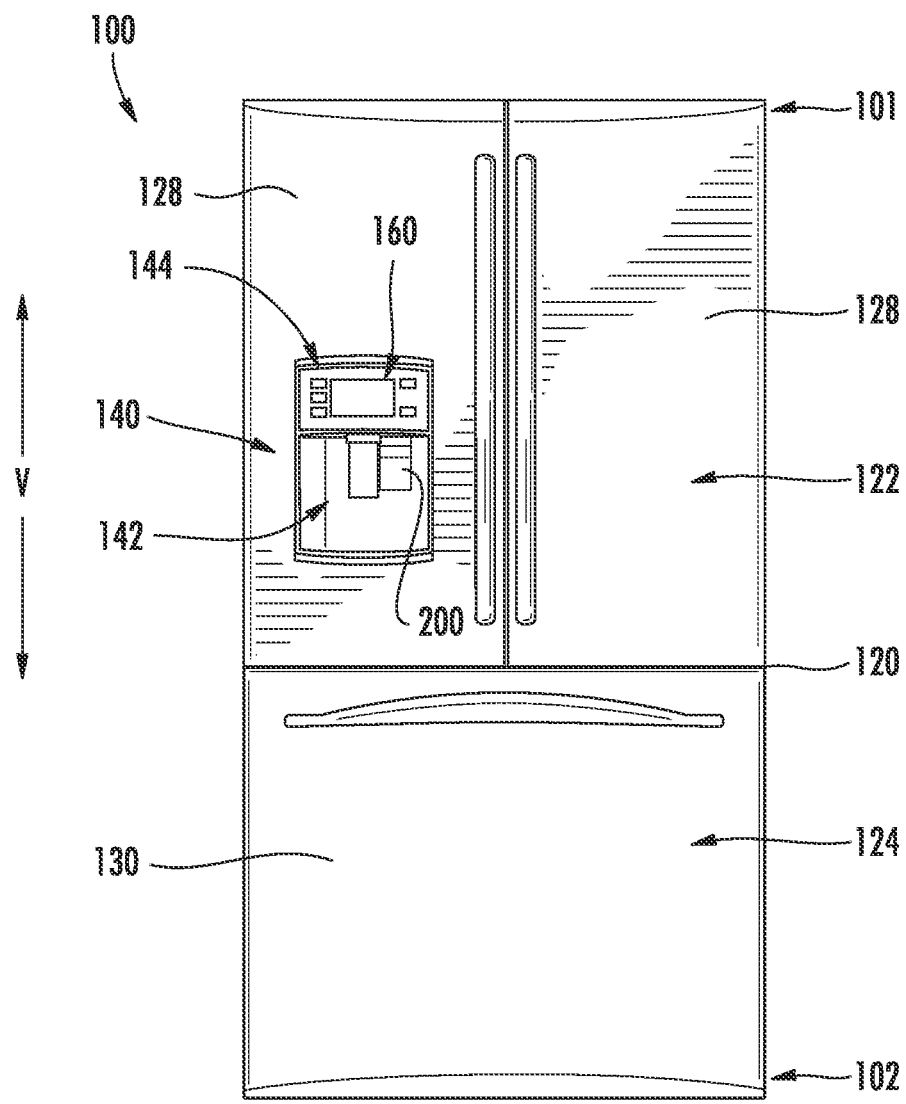
FIG. 1 provides a front, elevation view of a refrigerator appliance according to an exemplary embodiment of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the term "or" is generally intended to be inclusive (i.e., "A or B" is intended to mean "A or B or both"). The terms "first," "second," and "third" may be used interchangeably to distinguish one component from another and are not intended to signify location or importance of the individual components. The terms "upstream" and "downstream" refer to the relative flow direction with respect to fluid flow in a fluid pathway. For example, "upstream" refers to the flow direction from which the fluid flows, and "downstream" refers to the flow direction to which the fluid flows.

Turning now to the figures, FIG. 1 provides a front, elevation view of a domestic appliance, according to an example embodiment of the present subject matter. Specifically, FIG. 1 illustrates a domestic appliance that is a refrigerator appliance 100. Refrigerator appliance 100 includes a cabinet or housing 120. Housing 120 extends between an upper portion 101 and a lower portion 102 along a vertical direction V. Housing 120 defines chilled chambers (e.g., a fresh food compartment 122 positioned adjacent upper portion 101 of housing 120 and a freezer compartment 124 arranged at lower portion 102 of housing 120). Housing 120 also defines a mechanical compartment (not shown) for receipt of a sealed cooling system for cooling fresh food compartment 122 and freezer compartment 124.

Refrigerator appliance 100 is generally referred to as a bottom-mount refrigerator appliance. However, it should be understood that refrigerator appliance 100 is provided by way of example only. Thus, the present subject matter is not limited to refrigerator appliance 100 and may be utilized in any suitable domestic appliance having a beverage dispenser. For example, one of skill in the art will understand that the present subject matter may be used with side-by-side style refrigerator appliances or top-mount refrigerator appliances, as well as stand-alone beverage or brewing appliances.

In exemplary embodiments, refrigerator doors 128 are rotatably hinged to housing 120 proximate fresh food compartment 122 in order to permit selective access to fresh food compartment 122. A freezer door 130 is arranged below refrigerator doors 128 for accessing freezer compartment 124. Freezer door 130 is mounted to a freezer drawer (not shown) slidably coupled within freezer compartment 124.

Figure 2:
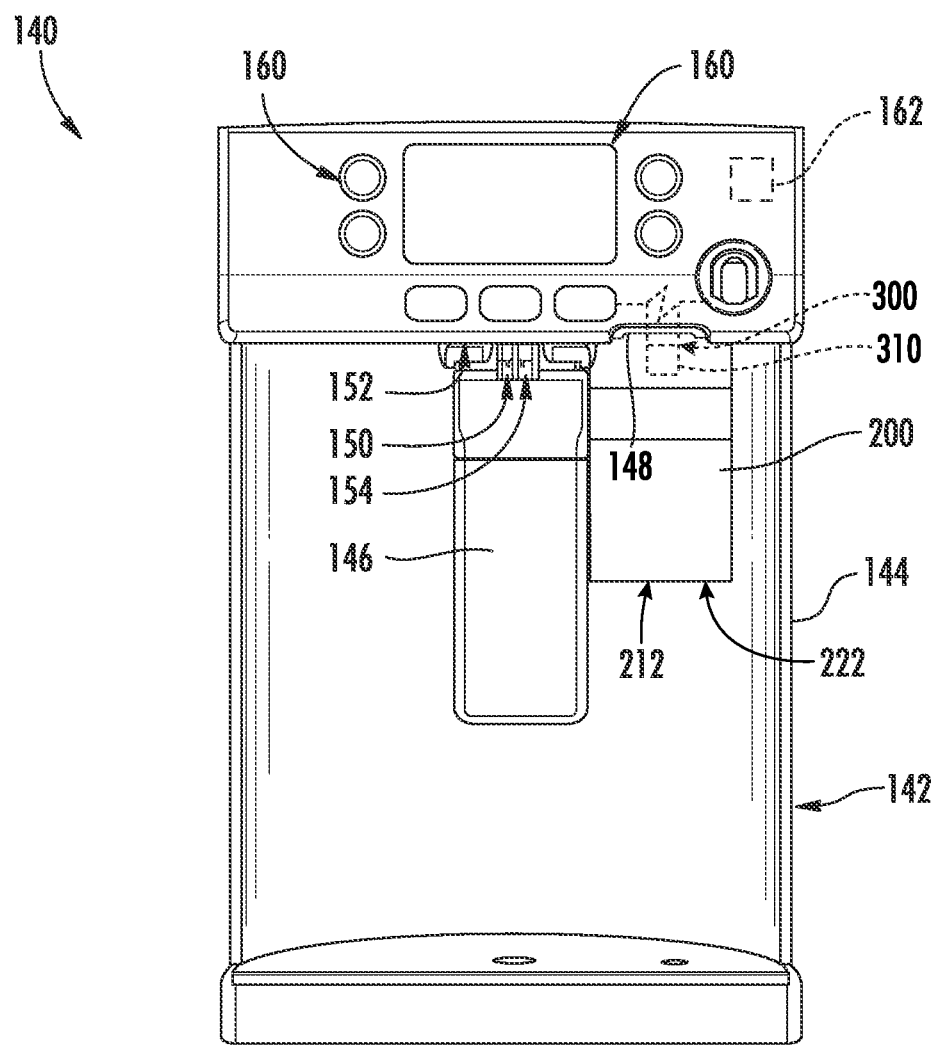
FIG. 2 provides a front, elevation view of a dispensing assembly of the exemplary refrigerator appliance of FIG. 1.

As shown in FIGS. 1 and 2, refrigerator appliance 100 may also include a dispensing assembly 140 for dispensing various fluids, such as liquid water or ice, to a dispenser recess 142 defined on one of refrigerator doors 128. In some embodiments, dispensing assembly 140 includes a dispenser body 144 that has an upper wall 148 and is fixed to the appliance 100. For instance, dispenser body 144 may be positioned on an exterior portion of refrigerator appliance 100, for example, at or defining dispenser recess 142 (e.g., such that upper wall 148 is disposed above dispenser recess 142). In the illustrated embodiments, dispensing assembly 140 includes several outlets for accessing ice, chilled liquid water, and heated liquid water. In order to access ice, chilled liquid water, and heated liquid water; dispensing assembly 140 may, for example, include a paddle 146 mounted below a chilled water outlet 150, an ice outlet 152, and a heated water outlet 154.

During operation of dispensing assembly 140, a user may urge a vessel, such as a cup, against paddle 146 to initiate a flow of chilled liquid water, heated liquid water or ice into the vessel within dispenser recess 142. In particular, a control panel or user interface panel 160 may be provided for controlling the mode of operation of dispensing assembly 140 (e.g., for selecting chilled liquid water, heated liquid water, crushed ice, or whole ice.) User interface panel 160 may include a chilled water dispensing button (not labeled), an ice-dispensing button (not labeled) and a heated water dispensing button (not labeled) for selecting between chilled liquid water, ice, and heated liquid water, respectively. User interface panel 160 may also include a display component, such as a digital or analog display device designed to provide operational feedback to the user.

Outlets 150, 152, 154 and paddle 146 may comprise an external part of dispensing assembly 140 positioned at or adjacent dispenser recess 142 (e.g., a concave portion defined in an outside surface of refrigerator door 128). Dispenser body 144 is positioned at a predetermined elevation convenient for a user to access ice or liquid water (e.g., enabling the user to access ice without the need to bend-over and without the need to access freezer compartment 124). In the example embodiment, dispenser body 144 is positioned at a level that approximates the chest level of a user.

Operation of the refrigerator appliance 100 can be regulated by a controller 162 that is operatively coupled to user interface panel 160 or various sensors as discussed below. User interface panel 160 provides selections for user manipulation of the operation of refrigerator appliance 100 such as, for example, selections between whole or crushed ice, chilled water, and other various options. In response to user manipulation of the user interface panel 160 or sensor signals, controller 162 may operate various components of the refrigerator appliance 100. Controller 162 may include a memory and one or more microprocessors, CPUs or the like, such as general or special purpose microprocessors operable to execute programming instructions or micro-control code associated with operation of refrigerator appliance 100. The memory may represent random access memory such as DRAM, or read only memory such as ROM or FLASH. In one embodiment, the processor executes programming instructions stored in memory. The memory may be a separate component from the processor or may be included onboard within the processor. Alternatively, controller 162 may be constructed without using a microprocessor (e.g., using a combination of discrete analog or digital logic circuitry; such as switches, amplifiers, integrators, comparators, flip-flops, AND gates, and the like) to perform control functionality instead of relying upon software.

Controller 162 may be positioned in a variety of locations throughout refrigerator appliance 100. In the illustrated embodiment, controller 162 is located within the user interface panel 160. In other embodiments, the controller 162 is positioned at any suitable location within refrigerator appliance 100, such as for example within a fresh food chamber, a freezer door, etc. Input/output ("I/O") signals may be routed between controller 162 and various operational components of refrigerator appliance 100. For example, user interface panel 160 may be in communication with controller 162 via one or more signal lines or shared communication busses.

As illustrated, controller 162 may be in communication with the various components of dispensing assembly 140 and may control operation of the various components. For example, the various valves, switches, etc. may be actuatable based on commands from the controller 162. As discussed, interface panel 160 may additionally be in communication with the controller 162. Thus, the various operations may occur based on user input or automatically through controller 162 instruction.

In certain embodiments, refrigerator appliance 100 also includes features for generating heated liquid water and directing such heated liquid water to dispensing assembly 140. Refrigerator appliance 100 need not be connected to a residential hot water heating system in order to supply heated liquid water to dispensing assembly 140. As would be understood, a water heating assembly may be provided and include, for example, a variety of water supplies, hot water tanks, heating elements, temperature sensors, and control valves to heat water from a well or municipal water supply, store the heated water, and supply the heated water to dispensing assembly 140.

Dispensing assembly 140 is optionally capable of providing heated water at various temperatures depending on the type of beverage being brewed. For example, when brewing ground coffee, water for brewing may be heated to between one hundred eighty degrees Fahrenheit and one hundred ninety degrees Fahrenheit. Additionally or alternatively, dispensing assembly 140 may be adjusted to provide water for making beverages at any suitable temperature.

Dispensing assembly 140 may include a water conduit or delivery system 300 for supplying heated water from the water heating assembly to dispensing assembly 140. Generally, water delivery system 300 may include a delivery nozzle 310 and any suitable number or configurations of conduit or piping connecting the delivery nozzle 310 to a heated water source. As will be described in greater detail below, at least a portion of delivery system 300 may be axially slidable (e.g., parallel to the vertical direction V). For instance, delivery nozzle 310 may extend between an elevated position where it is retracted on or relative to dispenser body 144 (e.g., at upper wall 148) and a lowered position where it protrudes downward along the vertical direction V toward or within dispenser recess 142. In certain embodiments, delivery nozzle 310 is a vertically oriented to selectively engage and provide heated water to a brew module 200.

Dispensing assembly 140 includes a brew module 200 according to exemplary embodiments of the present subject matter. Generally, brew module 200 is mountable within dispenser recess 142 such that brew module 200 can be in fluid communication with delivery nozzle 310 when mounted within dispenser recess 142. For example, when brew module 200 is installed on dispenser body 144, an inlet 206 defined through a lid 208 above a brewing or dispensing body 202 is in vertical alignment with the delivery nozzle 310 (e.g., a water outlet 314 of delivery nozzle 310). Water delivery system 300 may be configured for extending delivery nozzle 310 downward along the vertical direction V such that delivery nozzle 310 can fluidly connect to inlet 206. During use, heated water from the water heating assembly may flow into brew module 200 via delivery nozzle 310 at inlet 206. Within brew module 200, heated water may mix with, dissolve, or extract portions of a particulate material (e.g., held in a brew pod 210) to form a liquid beverage (e.g., a liquid coffee or tea solution), which may then exit brew module 200 through an outlet 212 defined through dispensing body 202.

Brew module 200 may include a body 202 that defines a dispense chamber 204. Dispense chamber 204 may be a substantially cylindrical chamber that is configured to receive a brew pod 210 (e.g., sealed, disposable cup or reusable mesh cup 234). A lid 208 can be rotatably attached to dispensing body 202 and selectively removed to permit selective access to dispense chamber 204. More specifically, lid 208 may be rotated onto dispensing body 202 about a dispenser axis A defined by dispensing body 202, as described in detail below.

Appliance 100 may include a slide joint 214 formed between dispenser body 144 and lid 208. For example, dispenser body 144 may define one or more flanges 216 that extend down from an upper wall 148 of dispenser body 144 to receive one or more corresponding rails 218 disposed on brew module 200. In particular, the flanges 216 may from and below the upper wall 148. Generally, the flanges 216 define a slide path P on which brew module may be received (e.g., a rotational or longitudinal slide path that extends along a direction that is non-parallel to the dispenser axis A). As shown, the rails 218 may be disposed on lid 208 (e.g., at a top portion thereof). When brew module 200 is connected to dispenser body 144, rails 218 may support brew module 200 on dispenser body 144. Moreover, rails 218 (e.g., with flanges 216) may permit movement along the slide path P. Thus, when connecting or removing brew module 200 to/from dispenser body 144, rails 218 may follow the slide path P to slide on the corresponding flanges 216 (e.g., horizontally).

Figure 13:
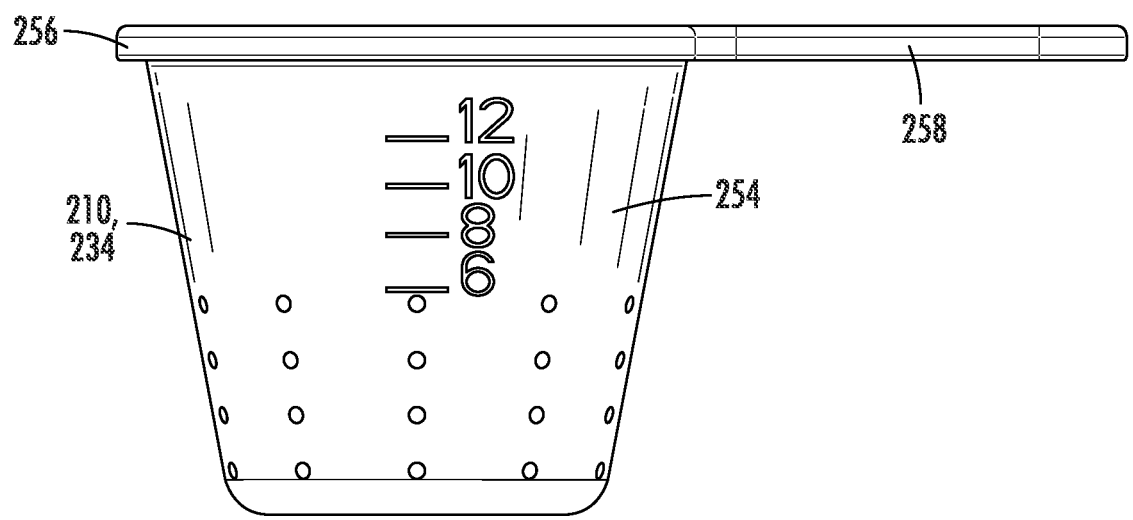
FIG. 13 provides an elevation view of the exemplary mesh cup of FIG. 10.
Figure 14:
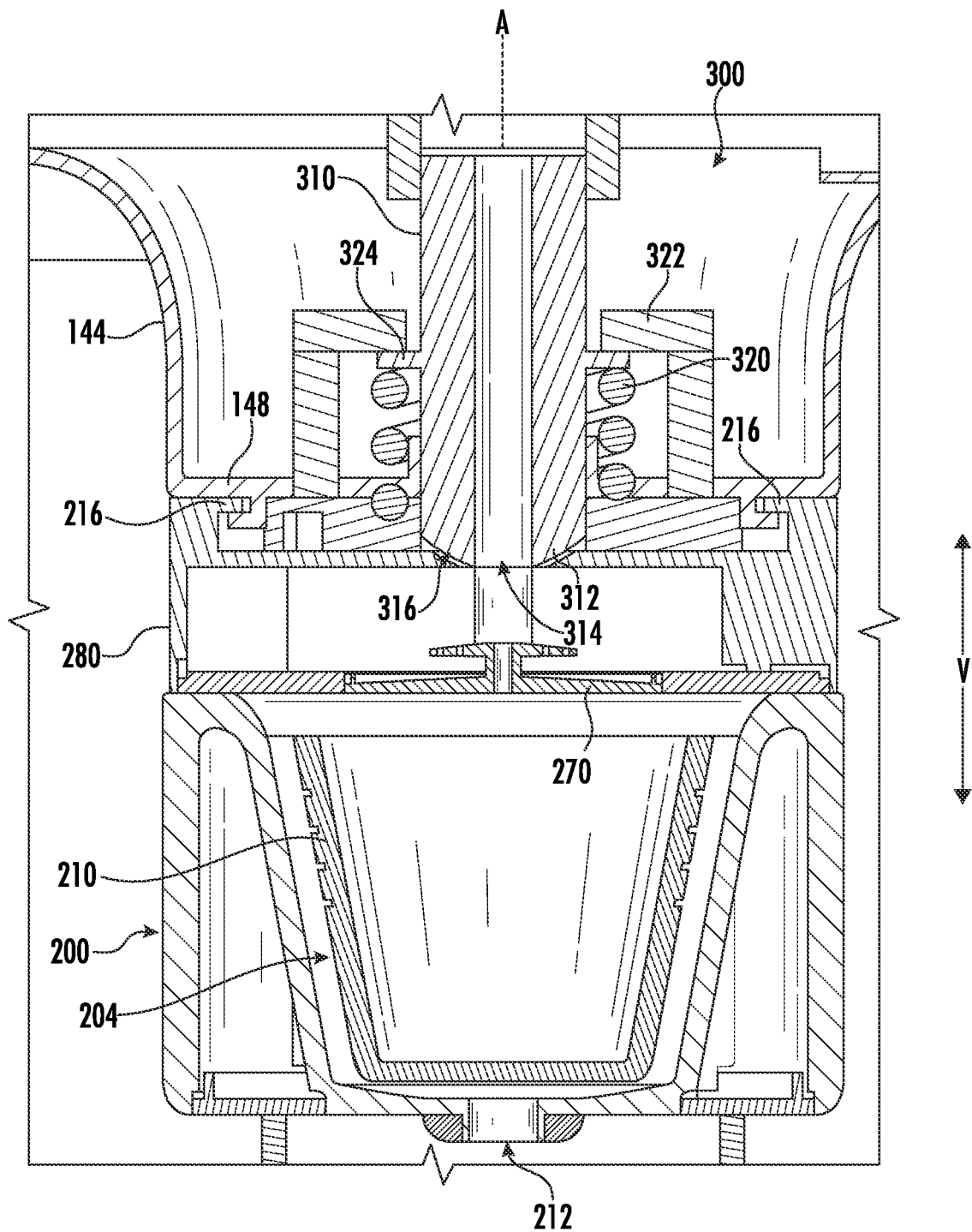
FIG. 14 provides a sectional elevation view of a portion of dispensing assembly, wherein the brew module is mounted within the dispenser recess.
Figure 15:
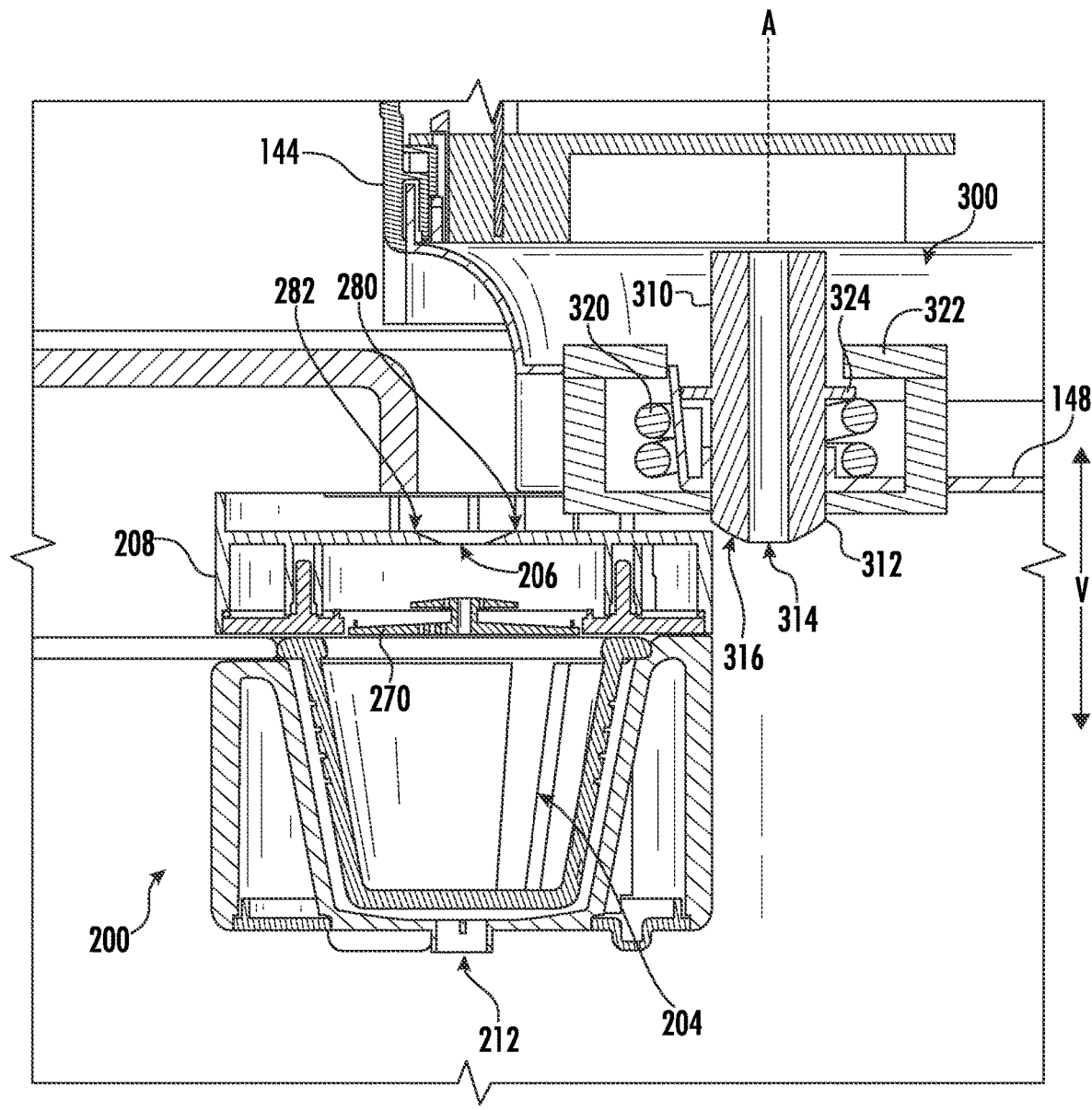
FIG. 15 provides a sectional elevation view of a portion of dispensing assembly, wherein the brew module is unmounted within the dispenser recess.

Turning especially to FIGS. 13 and 14, wherein the internal wall has been removed (e.g., for clarity), delivery nozzle 310 may be slidably attached to upper wall 148 to move up and down (e.g., axially) to selectively engage brew module 200 (e.g., at lid 208), such as when brew module 200 is installed or being installed. In particular, delivery nozzle 310 may be axially slidable between a lowered position and an elevated position. The lowered position may generally be reached when brew module 200 is uninstalled or otherwise spaced apart from dispenser body 144. In such a lowered position, the delivery nozzle 310 may be held across or within the slide path P. For instance, delivery nozzle 310 may bisect or interrupt a plane extending from (e.g., coplanar to) one or more of the flanges 216. If a pair of flanges 216 are provided (as pictured), delivery nozzle 310 may be disposed between the pair. Thus, movement of the brew module 200 along slide path P will generally bring brew module 200 into engagement or contact with delivery nozzle 310. For instance, brew module 200 may contact the nozzle tip 312. Engagement with brew module 200 during installation may force delivery nozzle 310 axially upward (e.g., to the elevated position). In some embodiments, nozzle tip 312 defines a tapered outer surface 316 motivate the delivery nozzle 310 axially upward in response to engagement with the brew module 200 along the slide path P. Thus, the longitudinal movement of brew module 200 may be translated into axial movement at the delivery nozzle 310.

As shown, the brew module 200 may include a flat upper surface 280 upon which nozzle tip 312 may slide (e.g., at the elevated position) until water outlet 314 is brought into alignment with the inlet 206 of brew module 200. Once alignment is reached, delivery nozzle 310 may remain in the elevated position, return to the lowered position, or fall to an intermediate position between the lowered and elevated positions.

Optionally, a stopper wall 322 may be fixed above nozzle tip 312 (e.g., above upper wall 148) to define an upper bound or maximum axial height for delivery nozzle 310. Thus, delivery nozzle 310 may move up and down relative to stopper wall 322, but no higher than the maximum height defined by stopper wall 322. In some such embodiments, a radial contact plate 324 extends radially outward from delivery nozzle 310 to move therewith and engage stopper wall 322.

In certain embodiments, a biasing spring 320 is included with delivery system 300 to motivate the delivery nozzle 310 toward the lowered position. As shown, biasing spring 320 may include a coiled tension spring fixed to upper wall 148 at one end and fixed to delivery nozzle 310 at another end to expand from the lowered position to the elevated position. Nonetheless, as would be understood in light of the present disclosure, any suitable spring structure in biased engagement with delivery nozzle 310 and fixed relative to dispenser body 144 may be provided. For instance, biasing spring 320 may include or be provided as a coiled compression spring, leaf spring, torsion spring, hydraulic spring, pneumatic spring, elastic polymer, etc.

Advantageously, the described embodiments may be operable to permit reliably facilitate the delivery of water from water delivery system 300 to brew module 200 (e.g., without requiring any active or electric motor to move delivery nozzle 310).

Figure 3:
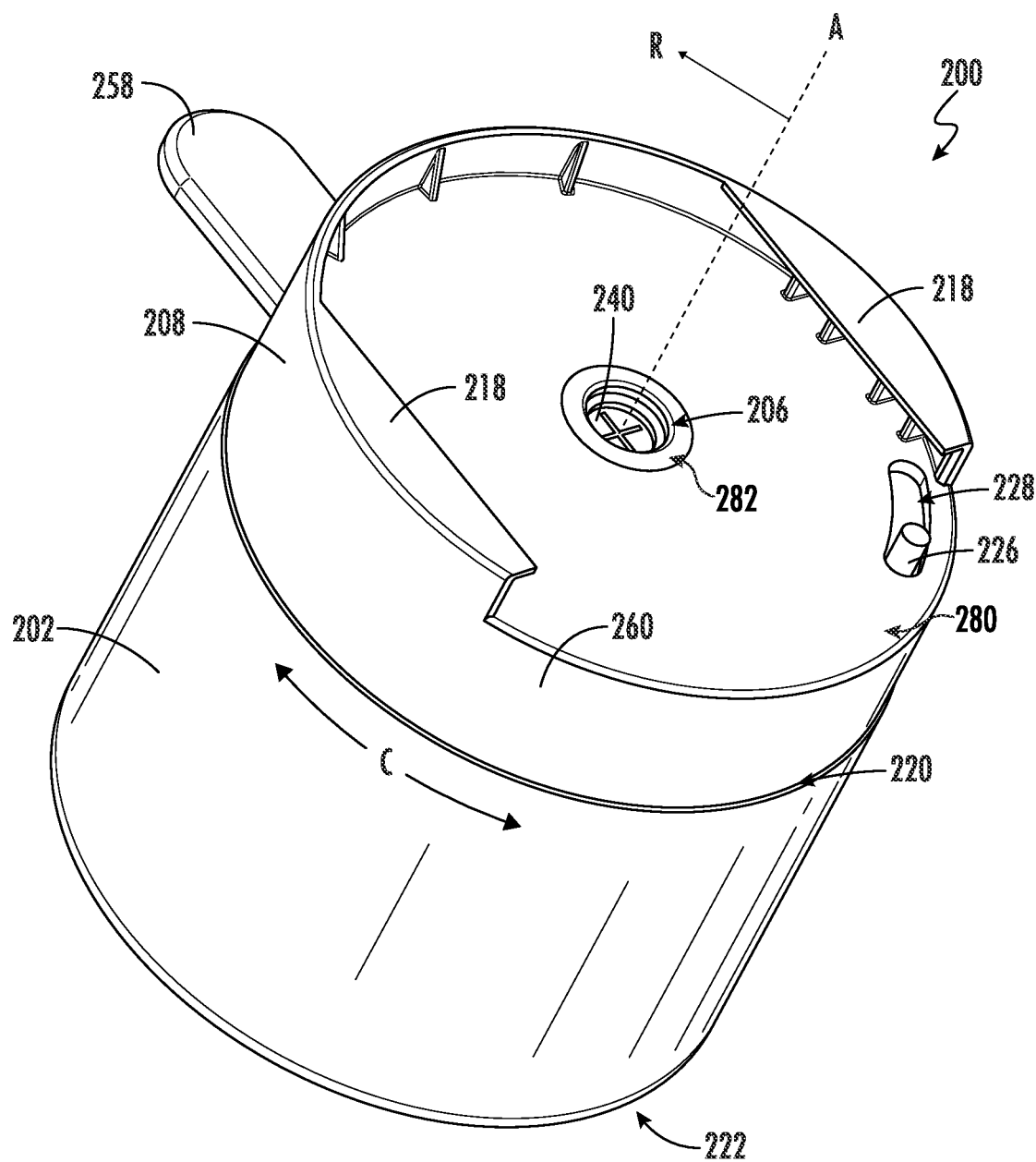
FIG. 3 provides a perspective view of an exemplary brew module for use with the exemplary dispensing assembly of FIG. 2, wherein a lid is shown in a first position.
Figure 4:
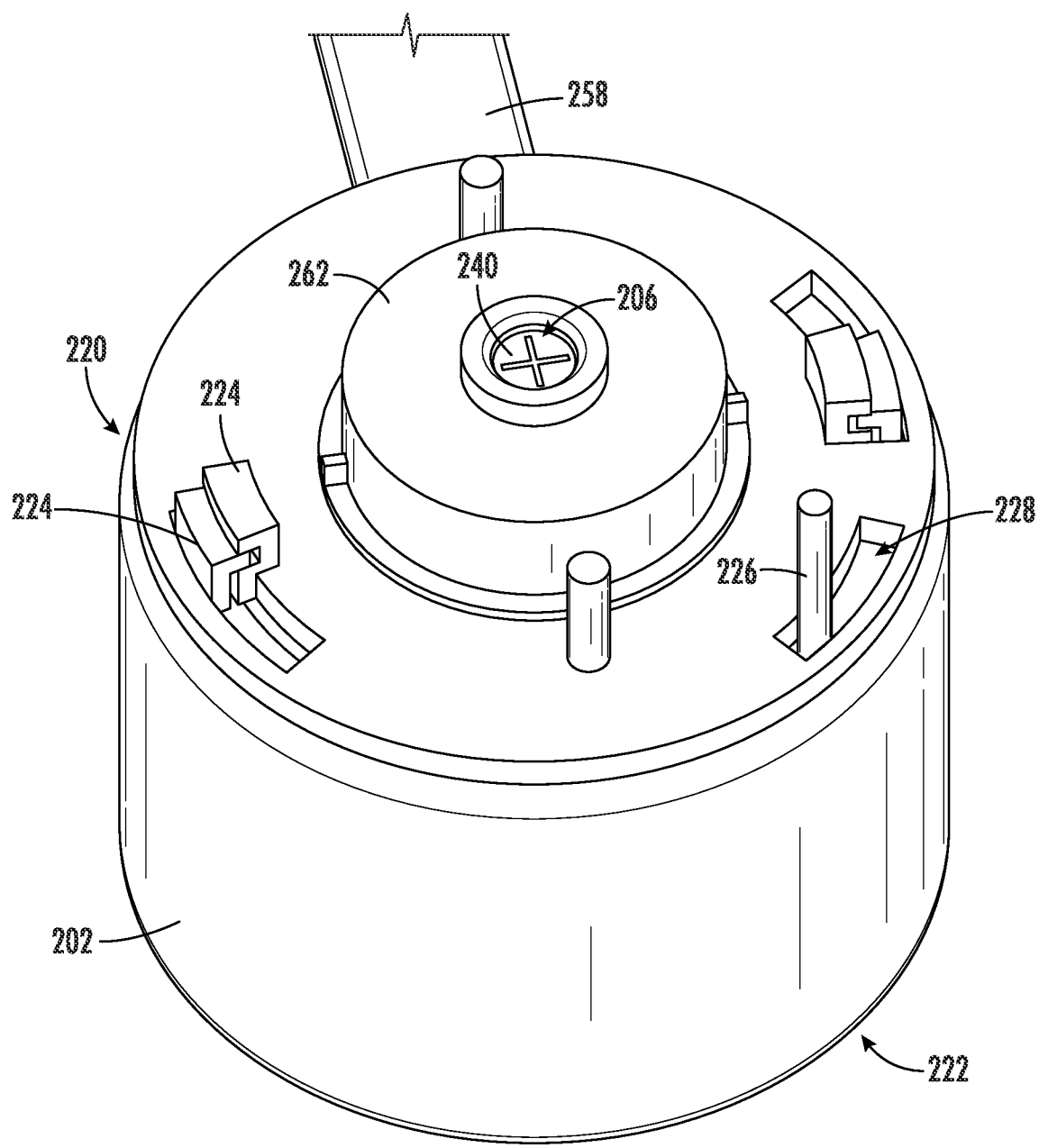
FIG. 4 provides a perspective view of the exemplary brew module of FIG. 3, wherein a portion of the lid is removed for clarity.
Figure 5:
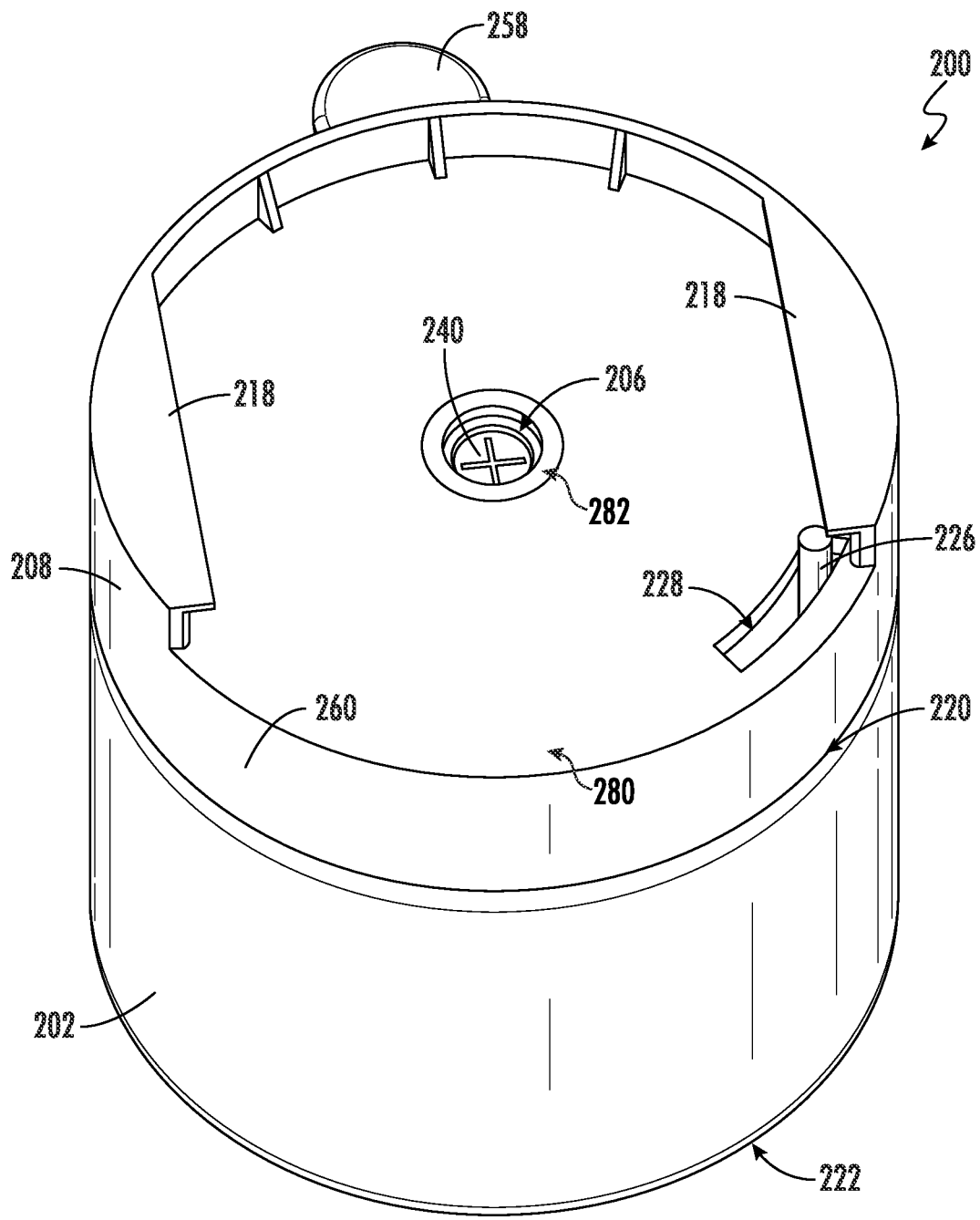
FIG. 5 provides a perspective view of the exemplary brew module of FIG. 3, wherein the lid is shown in a second position.
Figure 6:
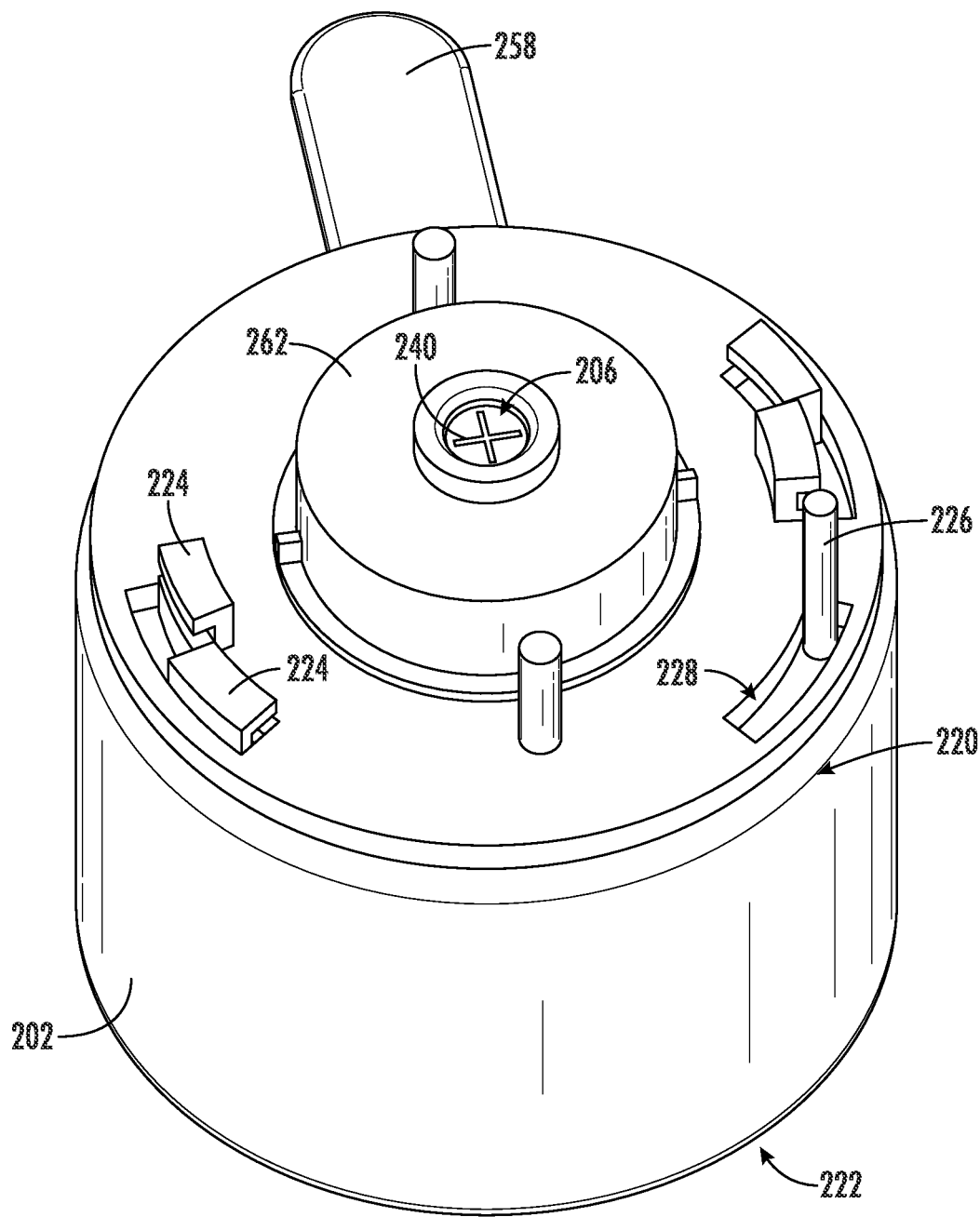
FIG. 6 provides a perspective view of the exemplary brew module of FIG. 5, wherein a portion of the lid is removed for clarity.
Figure 7:
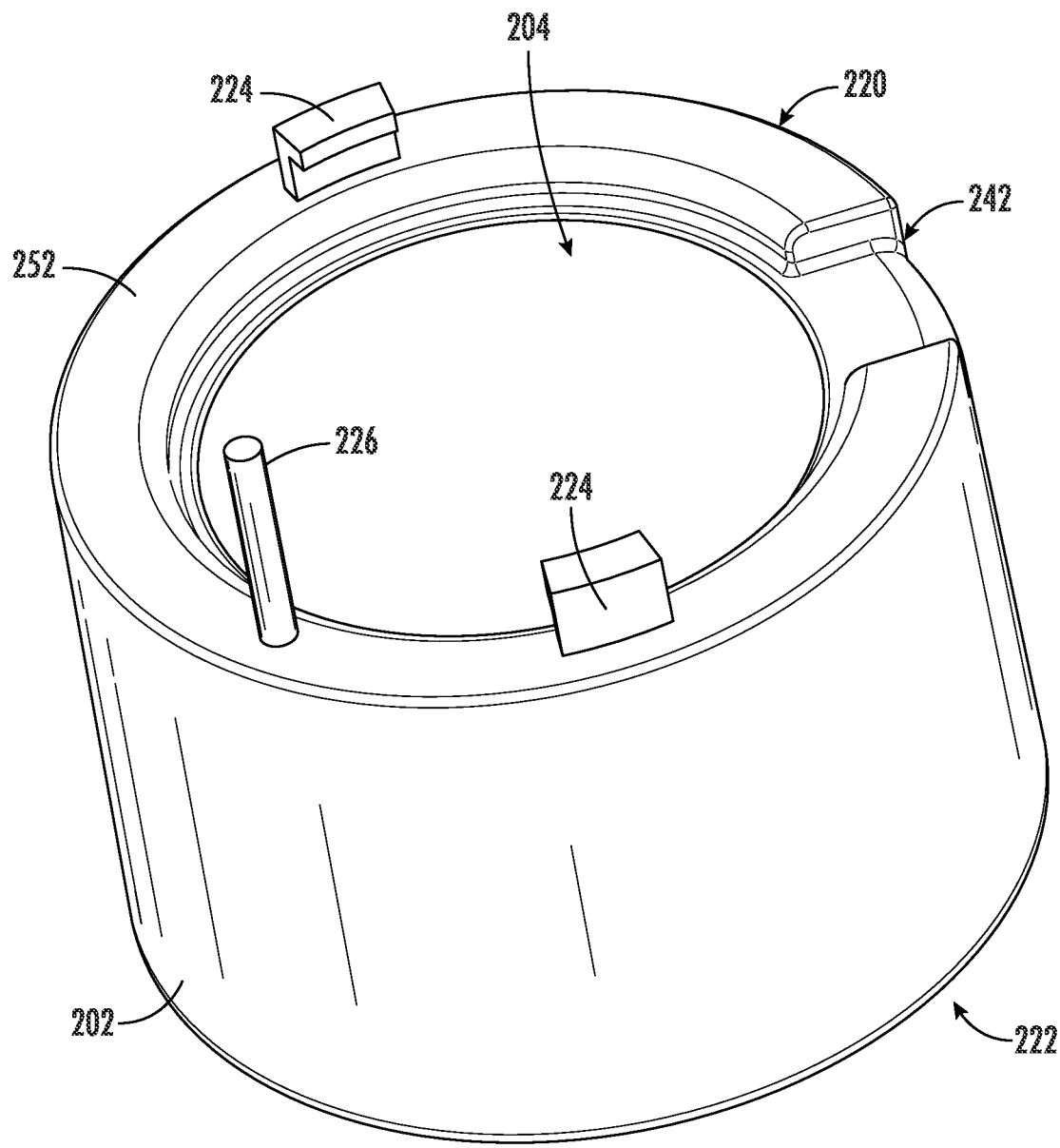
FIG. 7 provides a perspective view of a portion of the exemplary brew module of FIG. 3.
Figure 8:
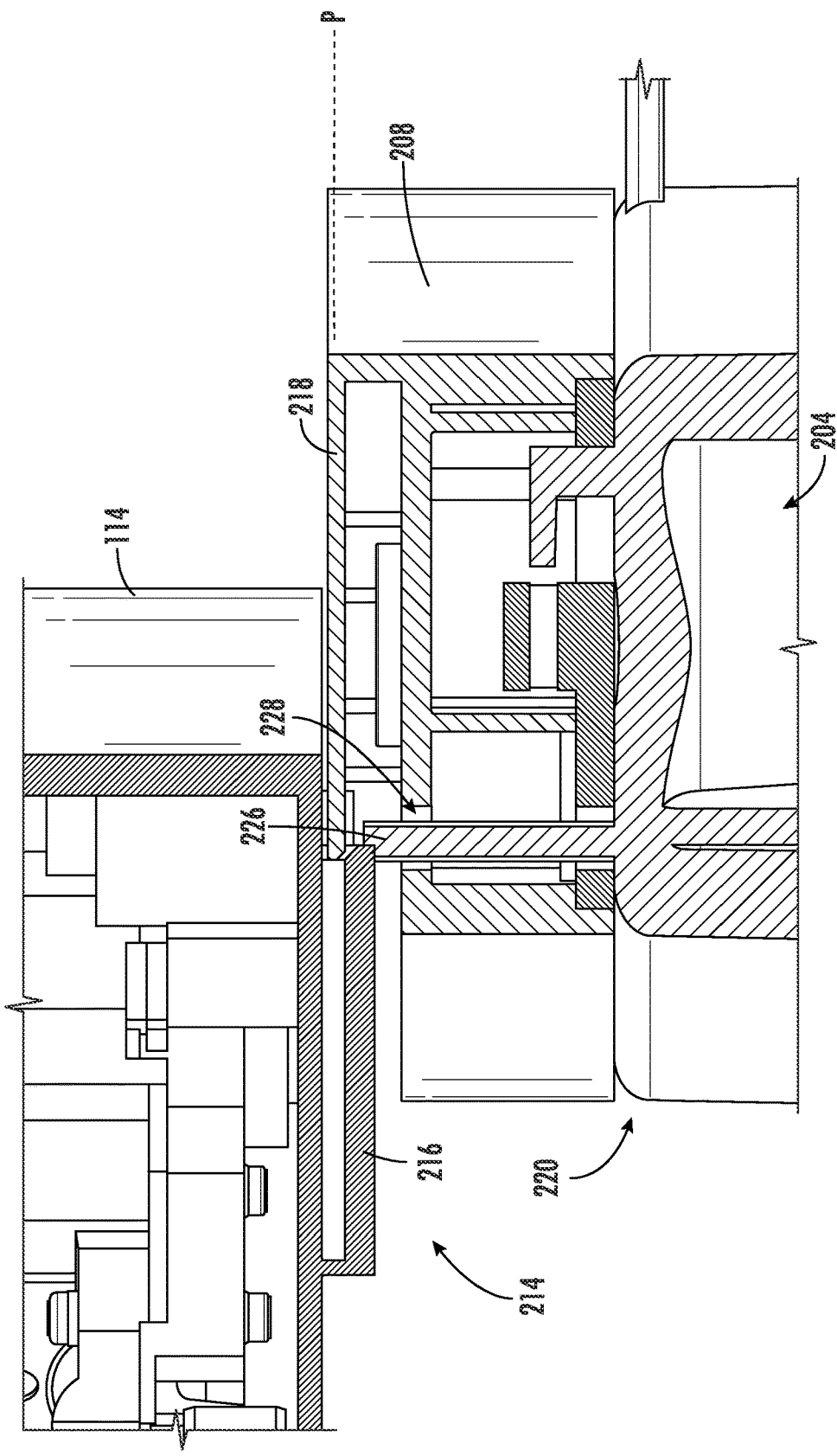
FIG. 8 provides a sectional elevation view of a portion of an exemplary dispensing assembly, wherein the lid is in the second position.
Figure 9:
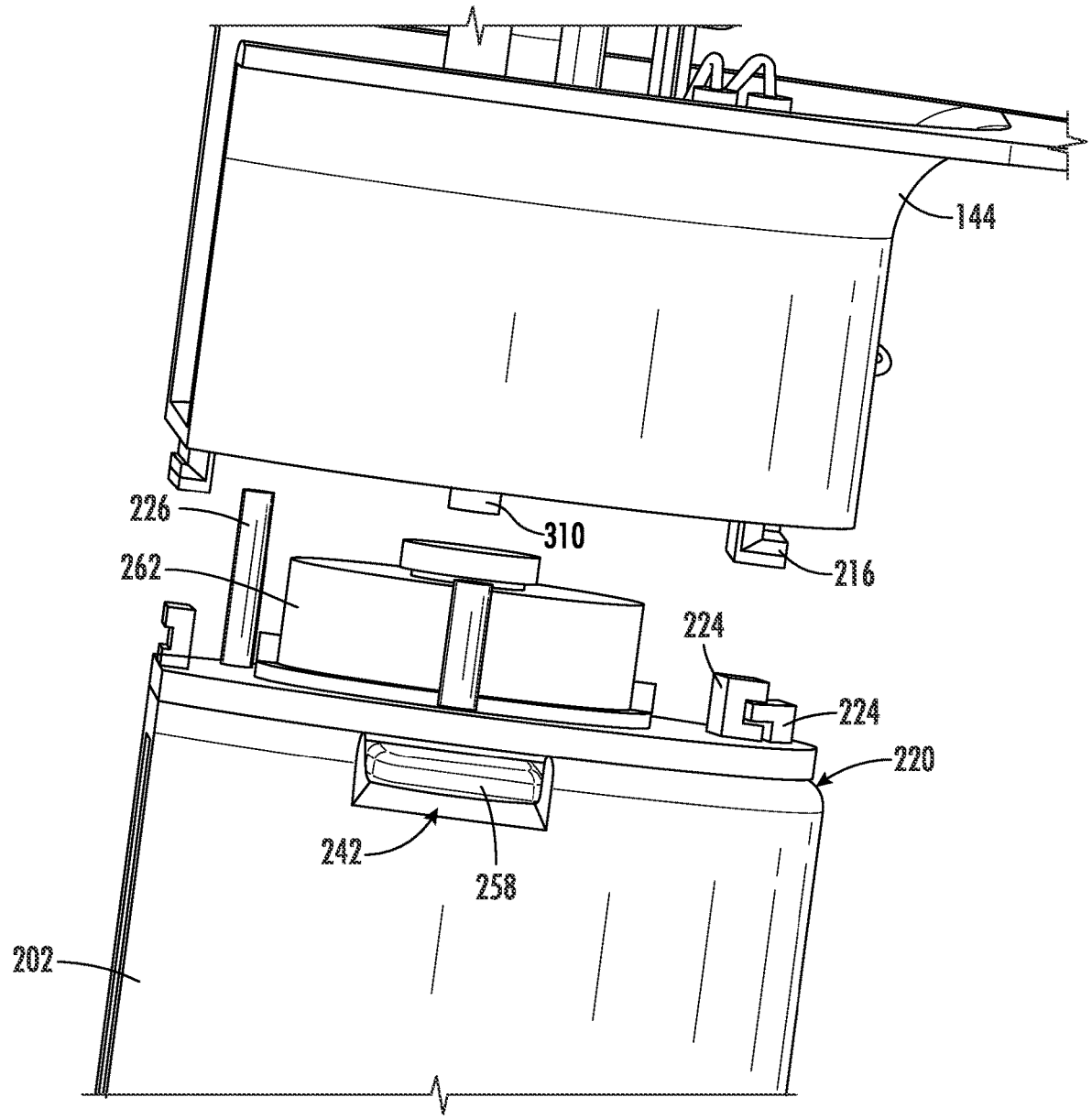
FIG. 9 provides a perspective view of a portion of an exemplary dispensing assembly, wherein a portion of the lid in the first position is removed for clarity.
Figure 10:
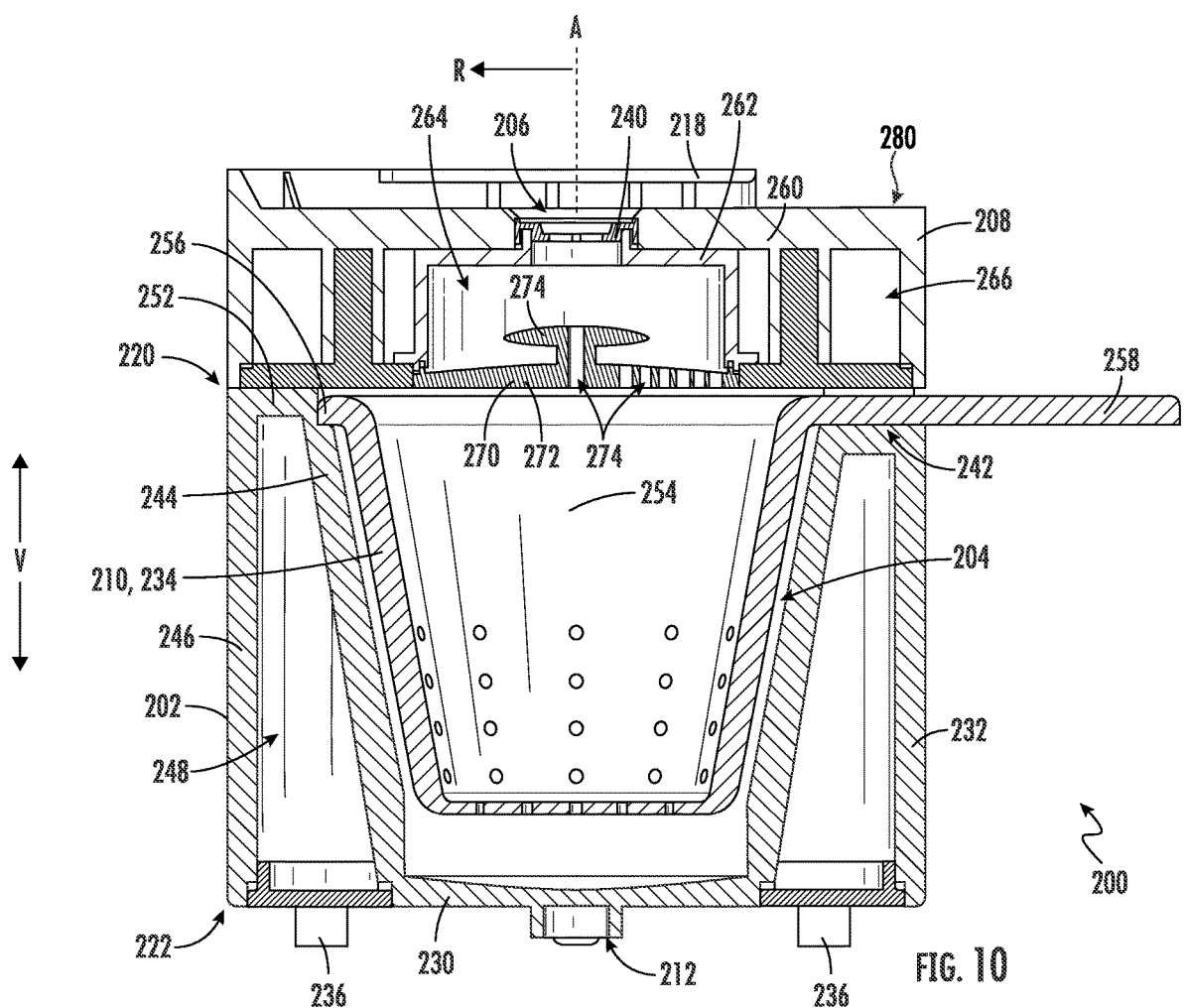
FIG. 10 provides a sectional elevation view of an exemplary brew module for use with the exemplary dispensing assembly of FIG. 2.
Figure 11:
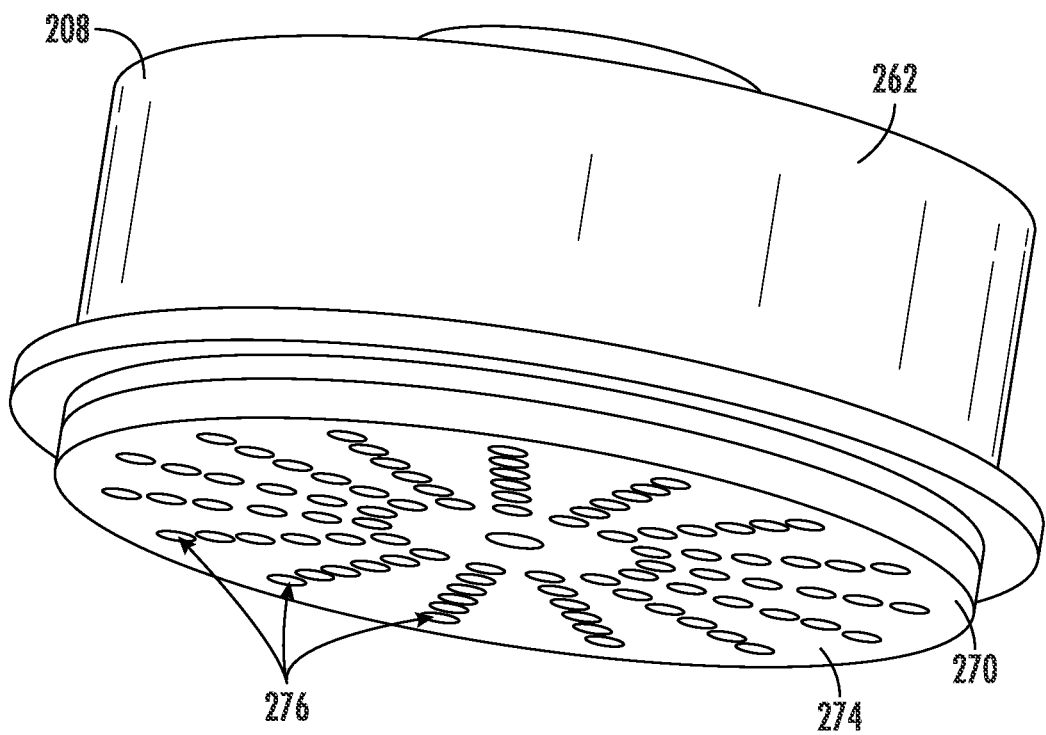
FIG. 11 provides a perspective view of a sub-chamber portion of the lid of the exemplary brew module of FIG. 10.
Figure 12:
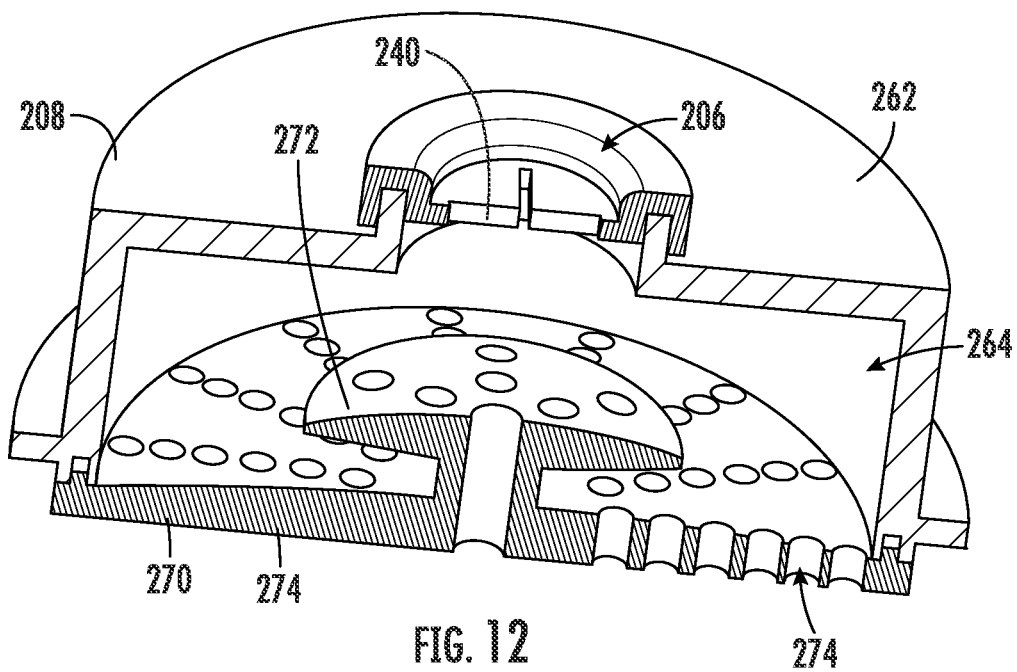
FIG. 12 provides a sectional perspective view of a sub-chamber portion of the lid of the exemplary brew module of FIG. 10.

Returning generally to FIGS. 3 through 14, when attached to dispensing body 202 (e.g., apart from dispenser body 144), lid 208 is rotatable about the dispenser axis A between a first position (FIGS. 3, 4, and 9) and a second position (FIGS. 5, 6, and 8). In certain embodiments, one or more mating teeth 224 (e.g., matched C-shaped hooks, threads, etc.) may hold lid 208 and dispensing body 202 together. For example, one or more teeth 224 extending from dispensing body 202 (e.g., upward at an upper end 220 of dispensing body 202) and one or more corresponding teeth 224 extending from lid 208 (e.g., downward at a lower end of lid 208) may selectively interlock together. In the exemplary embodiments, the mating teeth 224 are interlocked in circumferential alignment in the first position. Thus, the first position may restrict or prevent vertical movement of the lid 208 relative to the dispensing body 202. By contrast, in the second position, the mating teeth 224 may be unengaged and circumferentially spaced apart. Thus, the second position may permit vertical movement (e.g., separation) of lid 208 relative to the dispensing body 202. Advantageously, selective separation of the dispensing body 202 and lid 208 may permit full access to dispense chamber 204. Additionally or alternatively, thorough cleaning of brew module 200 may be notably permitted by separating dispensing body 202 and lid 208 (e.g., in a repeatable manner that allows for selective reattachment of lid 208 to dispensing body 202).

In some embodiments, a contact pin 226 is provided on brew module 200 to selectively interfere with the connection at slide joint 214 (e.g., when lid 108 is in the second position or otherwise not in the first position). As shown, contact pin 226 may movably disposed within a portion of the slide path P. In particular, contact pin 226 may selectively extending through the slide path P (e.g., perpendicular or nonparallel thereto adjacent to a rail 218) in the second position (or otherwise outside of the first position). By extending through the slide path P in the second position, contact pin 226 may block at least one rail 218 from sliding or moving on the corresponding flange 216. By contrast, in the first position, contact pin 226 may be spaced apart from the slide path and not extend through the same, thereby permitting slidable engagement between the corresponding rail(s) 218 and flange(s) 216.

In exemplary embodiments, contact pin 226 extends from dispensing body 202. For example, contact pin 226 may extend vertically or at a non-perpendicular (e.g., parallel) angle relative to dispenser axis A. In some such embodiments, contact pin 226 extends from the upper end 220 of dispensing body 202. As shown, contact pin 226 may be disposed radially outward from dispenser axis A. Optionally, contact pin 226 may extend from a portion or sidewall 232 of dispensing body 202 that is disposed radially outward from dispense chamber 204.

When assembled, contact pin 226 may extend through at least a portion of lid 208. In particular, lid 208 may define a pin aperture 228 through which contact pin 226 extends. As shown, contact pin 226 may thus be extended above at least a portion of rail 218 (e.g., in the second position). In some embodiments, pin aperture 228 permits circumferential movement or rotation of contact pin 226 therein. Optionally, pin aperture 228 may extend from a first circumferential point to a second circumferential point which in turn may engage contact pin 226 at the first position and the second position, respectively. Thus, pin aperture 228 may define or dictate first position or second position, at least in part.

Advantageously, the presently disclosed brew module 200 may be physically prevented from connecting to appliance 100 if or when (i.e., in response to) lid 208 is not fully secured (or otherwise in a predetermined desirable position) on dispensing body 202.

As shown, sidewall 232 may extend above bottom wall 230 (e.g., to upper end 220) about dispense chamber 204. Thus, sidewall 232 may define an opening to dispense chamber 204 at upper end 220 through which at least a portion of brew pod 210 may be received. Optionally, an upper notch 242 may be defined as a vertical or axial recess through sidewall 232 at upper end 220. Thus, upper notch 242 may extend through sidewall 232 to form, for instance, a U-shaped radial gap in the sidewall 232 at upper end 220.

In some embodiments, sidewall 232 includes an interior wall 244 and exterior wall 246 radially spaced apart from interior wall 244. For example, one or more intermediate rims 252 may radially join interior wall 244 and exterior wall 246 (e.g., at upper end 220 or lower end 222). Optionally, an insulation gap 248 may be defined between the interior wall 244 and exterior wall 246. Thus, interior wall 244 and exterior wall 246 may radially bound insulation gap 248. Intermediate rim(s) 252 may further axially bound insulation gap 248 (e.g., while extending radially between interior wall 244 and exterior wall 246).

In optional embodiments, mesh cup 234 can be selectively received within dispense chamber 204. Thus, mesh cup 234 may be sized smaller than at least a portion of dispense chamber 204 (e.g., at interior wall 244). As shown, mesh cup 234 may include a concave scoop 254. Multiple apertures or holes defined through mesh cup 234 may be sufficiently sized to retain particulate (e.g., coffee grounds, tea leaves, etc.) within mesh cup 234 while still permitting liquid therethrough, as would be understood. Optionally, mesh cup 234 may have a radial rim 256 that holds mesh cup 234 (e.g., on sidewall 232) within dispense chamber 204 such that a lowermost surface of mesh cup 234 is spaced apart from an inner surface of bottom wall 230. Thus, mesh cup 234 may be held above bottom wall 230. Additionally or alternatively, the lowermost surface of mesh cup 234 may be defined as a flat or planar surface. A volume of liquid may thus be permitted to accumulate between mesh cup 234 and bottom wall 230 (e.g., before being dispensed through outlet 212). Opposite from the lowermost surface of mesh cup 234, mush cup may define a cup opening through which particulate or liquid (e.g., liquid water) may be received. In optional embodiments, a handle 258 extends radially outward from mesh cup 234 (e.g., at the primary opening of mesh cup 234, such as would be defined at a top end of mesh cup 234). When assembled such that mesh cup 234 is received within dispense chamber 204, handle 258 may extend through sidewall 232 (e.g., at notch 242, which may be sized to match handle 258) and to a region outside of dispensing body 202, even when lid 208 is attached to dispensing body 202.

As noted above, lid 208 may be selectively attached to dispensing body 202. Moreover, lid 208 defines an inlet 206 above and upstream from dispense chamber 204. During use, liquid (e.g., heated water) may thus be provided to dispense chamber 204 through inlet 206 (e.g., from delivery nozzle 310). For instance, when brew module 200 is installed on dispenser body 144, inlet 206 may be disposed in axial alignment with the water outlet 314 to receive water therefrom.

Optionally, lid 208 may further define a nozzle seat 282 on which nozzle tip 312 may rest. Specifically, nozzle seat 282 may provide a concave groove or indentation about inlet 206. As shown, nozzle seat 282 may generally complement or mirror the shape of nozzle tip 312. During installation, delivery nozzle 310 may be permitted to deflect downward such that at least a portion of nozzle tip 312 is held within nozzle seat 282. Moreover, when brew module 200 is installed on dispenser body 144, delivery nozzle 310 may be supported on nozzle seat 282.

In some embodiments, a resilient uni-directional valve 240 (e.g., silicone one-way valve) is disposed across inlet 206. For instance, the resilient uni-directional valve 240 may be mounted on or within internal wall 262. When assembled, resilient uni-directional valve 240 may prevent fluid flow through inlet 206 from dispense chamber 204. In other words, resilient uni-directional valve 240 may direct the flow of liquid downstream through inlet 206 to dispense chamber 204 while preventing a reverse flow of liquid out of the brew module 200 through the inlet 206. Moreover, resilient uni-directional valve 240 may be configured with a preset pressure threshold, as would be understood, to open access dispense chamber 204. After delivery nozzle 310 is removed from lid 208, residual volumes may be prevented from dripping into or from inlet 206.

In optional embodiments, lid 208 defines a sealed sub-chamber 264 below or downstream from inlet 206 to hold a volume of liquid (e.g., water) above or upstream from dispense chamber 204. During use, liquid may thus accumulate within sealed sub-chamber 264 (e.g., from delivery nozzle 310) prior to being permitted to dispense chamber 204. When assembled, sealed sub-chamber 264 may be axially aligned or disposed directly above dispense chamber 204. An internal wall 262 of lid 208 may define sealed sub-chamber 264. Additionally or alternatively, internal wall 262 may be enclosed by external wall 260. Optionally, internal wall 262 may be nested within external wall 260. In some such embodiments, internal wall 262 is radially and axially bounded (e.g., from above) by external wall 260. An outer sub-chamber 266 may be defined between external wall 260 and internal wall 262 (e.g., in fluid isolation from inlet 206). Advantageously, heated water may be focused to dispense chamber 204 while splatter or disruption of particulate from dispense chamber 204 may be prevented.

In additional or alternative embodiments, a distributor plate 270 is provided between inlet 206 and dispense chamber 204. For example, distributor plate 270 may be mounted within lid 208 (e.g., inside or directly below sealed sub-chamber 264). As shown, distributor plate 270 may include a dispersion head 272 and a base platform 274. When assembled, base platform 274 may extend across an opening to dispense chamber 204 (e.g., defined by lid 208). Dispersion head 272 may extend above base platform 274. Optionally, dispersion head 272 may be axially aligned with inlet 206 or dispense chamber 204. In certain embodiments, dispersion head 272 provides a concave guiding surface. Base platform 274 may extend (e.g., radially) outward from dispersion head 272.

Distributor plate 270 generally defines a plurality of plate apertures 276 that extend (e.g., vertically or axially) through distributor plate 270 and through which water may be permitted to flow (e.g., from lid 208 or sealed sub-chamber 264) to dispense chamber 204. Specifically, a plurality of radially spaced plate apertures 276 are defined by base platform 274 to permit water (e.g., from the dispersion head 272 or delivery nozzle 310, which may be disposed above distributor plate 270, as shown) to the dispense chamber 204. Optionally, one or more additional plate apertures 276 may be defined by dispersion head 272 to permit water therethrough to dispense chamber 204.

During use, dispersion head 272 may serve to deflect or slow the flow of water to base platform 274 and dispense chamber 204 (e.g., from delivery nozzle 310). Moreover, flowing water may be distributed across an increased area of dispense chamber 204. Advantageously, liquid or water to dispense chamber 204 may be evenly flowed to particulate within brew pod 210 in a controlled manner. Additionally or alternatively, particulate may be prevented from being dislodged from dispense chamber 204 and, for example, being forced into lid 208.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A dispensing assembly of an appliance, the dispensing assembly comprising:
   a dispenser body defining a dispenser recess, the dispenser body comprising an upper wall fixed to the appliance above the dispenser recess;
   one or more flanges extending from and below the upper wall;
   a brew module selectively installed within the dispenser recess, the brew module defining a brew chamber therein, the brew module comprising one or more rails movably received on the one or more flanges to support the brew module within the dispenser recess; and
   a water delivery system mounted to the dispenser body in selective engagement with the brew module to deliver water thereto, the water delivery system comprising
      a delivery nozzle slidably attached to the upper wall, the delivery nozzle comprising a nozzle tip defining a water outlet to direct water to the brew module, the delivery nozzle being axially slidable between a lowered position and an elevated position, and
      a biasing spring motivating the delivery nozzle toward the lowered position in which the delivery nozzle is disposed to across the slide path to engage the brew module at the lowered position, wherein the one or more flanges define the slide path, and
   wherein the nozzle tip further defines a tapered outer surface motivate the delivery nozzle axially upward in response to engagement with the brew module along the slide path.

2. The dispensing assembly of claim 1, wherein the brew module defines an inlet upstream from the brew chamber, the inlet being disposed in selective axial alignment with the water outlet to receive water therefrom.

3. The dispensing assembly of claim 2, wherein the brew module further comprises a nozzle seat about the inlet, and wherein the nozzle tip is selectively supported on the nozzle seat above the brew chamber.

4. The dispensing assembly of claim 2, wherein the brew module further comprises a distributor plate disposed between the inlet and the brew chamber below the water outlet, the distributor plate defining a plurality of apertures to permit water to the brew chamber.

5. The dispensing assembly of claim 4, wherein the distributor plate comprises a dispersion head and a base platform, the dispersion head being disposed above the base platform to deflect water from the delivery nozzle to the base platform, and the base platform defining a plurality of radially spaced apertures to permit water from the dispersion head to the brew chamber.

6. The dispensing assembly of claim 1, wherein the brew module further comprises a brew pod selectively received within the brew chamber.

7. The dispensing assembly of claim 6, wherein the brew pod comprises a mesh cup selectively received within the brew chamber.

8. A dispensing assembly of an appliance, the dispensing assembly comprising:
   a dispenser body defining a dispenser recess, the dispenser body comprising an upper wall fixed to the appliance above the dispenser recess;
   one or more flanges extending from and below the upper wall;
   a brew module selectively installed within the dispenser recess, the brew module comprising
      a brewing body defining a brew chamber therein, and
      a lid selectively attached to the brewing body, the lid defining an inlet upstream from the brew chamber, the lid comprising one or more rails movably received on the one or more flanges to support the brew module within the dispenser recess; and
   a water delivery system mounted to the dispenser body in selective engagement with the brew module to deliver water thereto, the water delivery system comprising
      a delivery nozzle slidably attached to the upper wall, the delivery nozzle comprising a nozzle tip defining a water outlet to direct water to the brew module, the delivery nozzle being axially slidable between a lowered position and an elevated position, and
      a biasing spring motivating the delivery nozzle toward the lowered position in which the delivery nozzle is disposed to across the slide path to engage the brew module at the lowered position, wherein the one or more flanges define the slide path, and
   wherein the nozzle tip further defines a tapered outer surface motivate the delivery nozzle axially upward in response to engagement with the brew module along the slide path.

9. The dispensing assembly of claim 8, wherein the inlet is disposed in selective axial alignment with the water outlet to receive water therefrom.

10. The dispensing assembly of claim 9, wherein the lid further comprises a nozzle seat about the inlet, and wherein the nozzle tip is selectively supported on the nozzle seat above the brew chamber.

11. The dispensing assembly of claim 9, wherein the brew module further comprises a distributor plate disposed between the inlet and the brew chamber below the water outlet, the distributor plate defining a plurality of apertures to permit water to the brew chamber.

12. The dispensing assembly of claim 11, wherein the distributor plate comprises a dispersion head and a base platform, the dispersion head being disposed above the base platform to deflect water from the delivery nozzle to the base platform, and the base platform defining a plurality of radially spaced apertures to permit water from the dispersion head to the brew chamber.

13. The dispensing assembly of claim 8, wherein the brew module further comprises a brew pod selectively received within the brew chamber.

14. The dispensing assembly of claim 13, wherein the brew pod comprises a mesh cup selectively received within the brew chamber.

15. A dispensing assembly of an appliance, the dispensing assembly comprising:
- a dispenser body defining a dispenser recess, the dispenser body comprising an upper wall fixed to the appliance above the dispenser recess;
- one or more flanges extending from and below the upper wall;
- a brew module selectively installed within the dispenser recess, the brew module defining an inlet and a brew chamber downstream from the inlet, the brew module comprising one or more rails movably received on the one or more flanges to support the brew module within the dispenser recess; and
- a water delivery system mounted to the dispenser body in selective engagement with the brew module to deliver water thereto, the water delivery system comprising
  - a delivery nozzle slidably attached to the upper wall, the delivery nozzle comprising a nozzle tip defining a water outlet to direct water to the brew module, the delivery nozzle being axially slidable between a lowered position and an elevated position, and
  - a biasing spring motivating the delivery nozzle toward the lowered position,
- wherein the brew module comprises a brew body defining the brew chamber and a distributor plate disposed between the inlet and the brew chamber below the water outlet, the distributor plate defining a plurality of apertures to permit water to the brew chamber.

16. The dispensing assembly of claim 15, wherein the distributor plate comprises a dispersion head and a base platform, the dispersion head being disposed above the base platform to deflect water from the delivery nozzle to the base platform, and the base platform defining a plurality of radially spaced apertures to permit water from the dispersion head to the brew chamber.

17. The dispensing assembly of claim 15, wherein the inlet is disposed in selective axial alignment with the water outlet to receive water therefrom.

18. The dispensing assembly of claim 15, wherein the brew module further comprises a nozzle seat about the inlet, and wherein the nozzle tip is selectively supported on the nozzle seat above the brew chamber.

19. The dispensing assembly of claim 15, wherein the brew module further comprises a brew pod selectively received within the brew chamber.

20. The dispensing assembly of claim 19, wherein the brew pod comprises a mesh cup selectively received within the brew chamber.

* * * * *